(No Model.)
G. D. NELLENSTEYN.
EXTRACTING BAD ODORS FROM VEGETABLES, &c.
No. 431,278.                                Patented July 1, 1890.
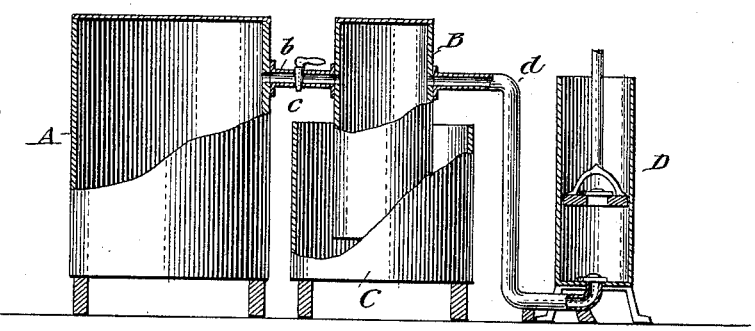
WITNESSES:
INVENTOR:
G. D. Nellensteyn
BY Munn & Co.
ATTORNEYS

UNITED STATES PATENT OFFICE.

GŸSBERT DIRK NELLENSTEŸN, OF AMSTERDAM, NETHERLANDS.

EXTRACTING BAD ODORS FROM VEGETABLES, &c.

SPECIFICATION forming part of Letters Patent No. 431,278, dated July 1, 1890.

Application filed December 18, 1889. Serial No. 334,179. (No specimens.)

*To all whom it may concern:*

Be it known that I, GŸSBERT DIRK NELLENSTEŸN, of Amsterdam, Netherlands, have invented an Improvement in Extracting Bad Odors from Vegetable and other Substances, of which the following is a full, clear, and exact description.

This invention relates to the treatment of leaves, fruits, barks, various sorts of wood, and other substances containing volatile elements or principles, or such parts of said and other substances which contain or produce the bad odors, for the purpose of purifying the products or substances containing the bad odors.

Among the various substances which may be treated by my method may be mentioned tobacco-leaves, tea-leaves, coffee and cocoa grains, nutmegs, and the like, which have become musty or otherwise affected with bad odors.

The invention consists in a novel, simple, and easy method or process of accomplishing the above result, the substances or parts of substances containing the bad odors being treated *in vacuo*, subjected or not, as desired, to a previous treatment with a dissolving material—such, for instance, as ether of petroleum or other volatile solvent—and in which the volatile elements that cause bad odors, extracted or evaporated in vacuum at an ordinary temperature, may be afterward and separately condensed at a lower temperature, substantially as hereinafter described, and pointed out in the claim.

For the purpose of explaining how my invention is or may be carried into practice, I will now proceed to describe the same in connection with an apparatus which will serve as well as any other to show how the desired result is or may be obtained, reference being had to the accompanying drawing, which represents a longitudinal vertical section of such apparatus.

A indicates a vessel made of any suitable material, and of sufficient strength when a vacuum is produced within it to resist external atmospheric pressure. Said vessel is provided with a lid capable of being hermetically closed. This vessel is connected with a receiver B by a pipe $b$, having a cock $c$, to establish communication as required with the vessel A, said receiver also being provided with a hermetically-closing lid. The receiver B is placed in a cooler C, which may contain a mixture of sulphate of soda with hydrochloric acid, or ice with chloride of sodium, or any other substances or means may be used to chill or lower the temperature of the receiver B, when such is required. Said receiver is connected by a pipe $d$ with an exhaust-air pump D, or with any other means adapted to exhaust the air from the apparatus.

The operation of this apparatus as used in carrying out my invention is as follows: The reservoir or vessel A is charged with the leaves, fruit, bark, various kinds of wood, or other substances or parts of substances containing the volatile elements which cause the bad odors, after which said vessel is hermetically closed. The air is then exhausted from the reservoir A and receiver B by the pump D or otherwise, the cock $c$ being opened either immediately or gradually to establish communication of the reservoir A with the receiver B. By exhausting the air from the apparatus, or carrying out the treatment *in vacuo*, the volatile elements evaporated from the leaves, fruits, or other substances which cause their bad odors, will be drawn off and afterward removed through the air-pump. In the case of substances from which it is difficult to evaporate or extract the volatile elements which produce the bad odors, the extraction of said elements is facilitated or improved and the products rendered more inodorous by previously treating the substances with a dissolving material, such as ether of petroleum or other suitable volatile solvent having a like effect.

It is to be understood that substances containing aromatic oils, which cause their delicious smell, are not to be treated with a solvent, as such treatment would cause them to lose their fragrance.

By reason of the cold produced in the cooler C, which incloses the receiver B, by either one of the hereinbefore-named freezing mixtures, the extracted volatile elements producing the bad odors are condensed in the receiver B, from whence they can afterward be removed in order to be utilized.

The quantity of leaves, fruits, or other substances treated at one and the same time will necessarily vary, as also the length of time of their treatment and the degree to which the substances are rendered inodorous. The process virtually amounts to, first, simply extracting the bad odors *in vacuo;* secondly, extracting the same *in vacuo*, and afterward condensing the volatile elements at a lower temperature, and, thirdly, extracting them *in vacuo* and condensing them, together with the use of volatile solvents, when the nature of the substances under treatment require such.

Among the advantages obtained by my treatment is the rendering of the substances under treatment perfectly inodorous or free from any bad odors they contained, thereby augmenting their value. The process is both simple and economical in its effects, the same consisting of evaporation by the aid of a vacuum, with, if required, a previous treatment of the substances from which the bad odors are required to be extracted with absorbing or dissolving materials, and the condensing of the volatile extracts.

Having thus fully described my invention, I claim as new and desire to secure by Letters Patent—

That improvement in the art of removing bad odors from leaves, fruits, barks, woods, and other substances, which consists in first treating said substances with a volatile solvent—such, for instance, as ether of petroleum—then exposing said substances in a vacuum, so that evaporation of the volatile elements of the substances themselves and those of the solvent takes place, and subsequently condensing such extracted parts for the purpose of recovering and utilizing them when required, as set forth.

GŸSBERT DIRK NELLENSTEŸN.

Witnesses:
A. SHLOCER,
G. VANDERMAELEN.